United States Patent [19]

Nishitani et al.

[11] Patent Number: 4,607,294

[45] Date of Patent: Aug. 19, 1986

[54] MAGNETIC VIDEO RECORDING APPARATUS FOR INTERMITTENT RECORDING

[75] Inventors: Yoshihisa Nishitani, Suita; Yukio Osafune, Nagaokakyo, both of Japan

[73] Assignee: Mitsubishi Denki Kabushiki Kaisha, Tokyo, Japan

[21] Appl. No.: 563,520

[22] Filed: Dec. 20, 1983

[30] Foreign Application Priority Data

Dec. 29, 1982 [JP] Japan ................. 57-229791

[51] Int. Cl.⁴ ................. H04N 5/782; G11B 15/467
[52] U.S. Cl. ................. 360/35.1; 360/72.1; 360/72.3; 360/74.1
[58] Field of Search ........... 360/35.1, 70, 71, 72.1, 360/72.3, 74.1

[56] References Cited

U.S. PATENT DOCUMENTS

| | | | |
|---|---|---|---|
| 2,874,214 | 2/1959 | Anderson | 360/35.1 |
| 2,955,157 | 10/1960 | Young | 360/35.1 |
| 3,025,344 | 3/1962 | Bosustow | 360/35.1 |
| 3,081,379 | 3/1963 | Lemelson | 360/35.1 |
| 3,352,968 | 11/1967 | Walter et al. | 360/35.1 |
| 3,397,283 | 8/1968 | Stosberg et al. | 360/35.1 |
| 3,881,186 | 4/1975 | Nakauchi et al. | 360/71 X |
| 4,035,843 | 7/1977 | Tanimura | 360/35.1 |
| 4,092,680 | 5/1978 | Sander | 360/72.3 |
| 4,403,250 | 9/1983 | Kellar | 360/35.1 X |
| 4,511,937 | 4/1985 | Guerrero | 360/72.1 |

*Primary Examiner*—Raymond F. Cardillo
*Assistant Examiner*—Wayne R. Young
*Attorney, Agent, or Firm*—Lowe Price LeBlanc Becker & Shur

[57] ABSTRACT

A magnetic video recording apparatus for intermittent recording comprises a capstan motor (2), a rotation detecting circuit (3), a control circuit (4) and a recording start instructing circuit (5). The control circuit (4) serves to apply driving voltage ($V_1$ and $V_2$) to the capstan motor (2) for a time interval corresponding to one frame, whereby a magnetic tape (1) is made to travel approximately for one frame. The travelling distance of the magnetic tape (1) is examined in the control circuit (4) by counting the number of pulse signals (PS) provided from the rotation detecting circuit (3). If the magnetic tape (1) is not made to travel exactly for one frame, the control circuit (4) applies driving voltage ($V_3$ and $V_4$) in the form of pulses to the capstan motor (2) till it travels exactly for one frame. Thus, the magnetic tape (1) is made to travel exactly for one frame.

3 Claims, 8 Drawing Figures

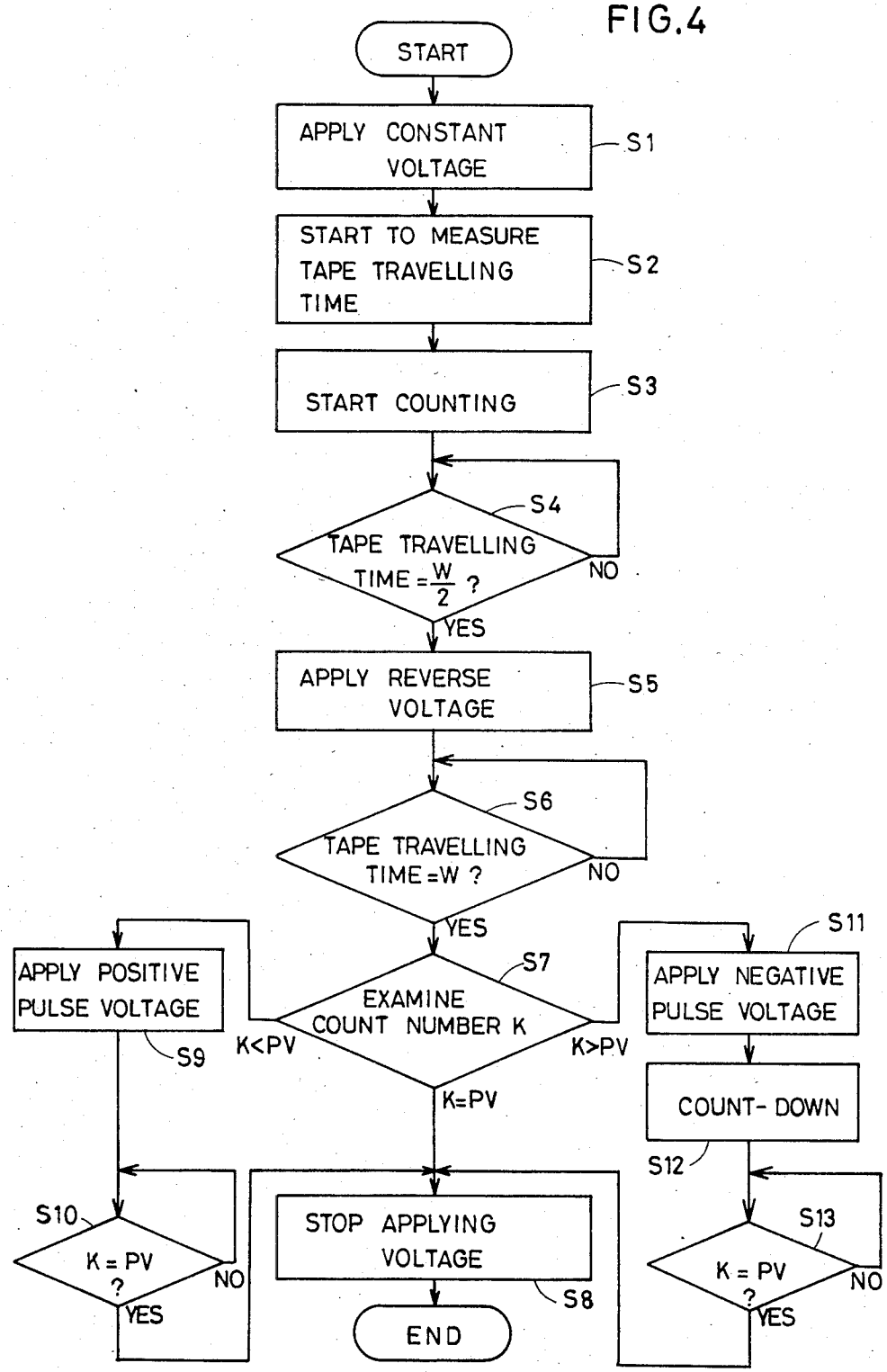

MAGNETIC VIDEO RECORDING APPARATUS FOR INTERMITTENT RECORDING

BACKGROUND OF THE INVENTION

1. Field of the Invention

The present invention relates to a magnetic video recording apparatus and particularly to a magnetic video recording apparatus in which a magnetic tape is made to travel intermittently for recording.

2. Description of the Prior Art

In a conventional video tape recorder of the VHS system or the β system, a magnetic tape is caused to travel by rotation of a motor made by applying a predetermined voltage for a fixed period of time to a capstan motor for enabling the magnetic tape to travel. However, in a video tape recorder for intermittent recording in which intermittent travelling of a magnetic tape makes possible recording for many hours, it often happens that such a recorder is influenced by load change and as a result, a magnetic tape cannot always be made to travel by a fixed distance by such a method of controlling the time for applying voltage to a capstan motor as described above. Accordingly, such a recorder has a disadvantage that the time of recording that can be made by one magnetic tape is not constantly fixed. In addition, there is also a disadvantage in such a recorder that since the control pulses for controlling the travelling of a magnetic tape are also recorded intermittently in the magnetic tape in response to its travelling, the frequency of the control pulses varies if the travelling distance of the magnetic tape is changed and accordingly, at the time of continuously reproducing, in an ordinary video tape recorder, the magnetic tape intermittently recorded, a disturbance appears in the video.

SUMMARY OF THE INVENTION

Briefly stated, the present invention is a magnetic video recording apparatus in which a magnetic tape is made to travel intermittently by one frame so as to record a video signal therein, the above stated magnetic video recording apparatus comprising: a capstan motor for enabling the magnetic tape to travel in response to the driving voltage applied thereto; a rotation detecting means coupled mechanically to the capstan motor for providing pulse signals according to the rotation of the capstan motor; a recording start instructing means for providing intermittently a recording start signal for instructing the start of recording; and a control means. The above stated control means comprises: a power supply means which provides the above stated driving voltage of the first polarity responsive to a recording start signal, provides the above stated driving voltage of the second polarity responsive to the first control signal applied thereto, provides the above stated driving voltage in pulses of the above stated first polarity responsive to the second control signal applied thereto and provides the above stated driving voltage in pulses of the above stated second polarity responsive to the third control signal applied thereto; a timer means which starts measuring the time responsive to the above stated recording start signal, provides the above stated first control signal when a time interval half as long as a unit time interval required for recording of one frame has passed and stops measuring the time when the above stated unit time interval half passed; a counter means which starts count-up responsive to the above stated recording start signal or the above stated second control signal and starts count-down responsive to the above stated third signal; and a comparing means which compares the count number K of the above stated counter means with a predetermined value PV at the time of stop of the measurement of the above stated timer means and stops application of the first control signal if K=PV, provides the second control signal if K<PV till the condition K=PV is satisfied and provides the third control signal if K>PV till the condition K=PV is satisfied. The above stated predetermined value PV is a value corresponding to the travelling distance of the magnetic tape for one frame as described above.

According to the present invention, the driving voltage applied to the capstan motor causes the magnetic tape to travel approximately for one frame. In the meantime, a video signal is recorded in the magnetic tape. The travelling distance of the magnetic tape is examined in the control means by counting the number of pulse signals provided from the rotation detecting means. If the magnetic tape is not made to travel exactly for one frame, the control means applies driving voltage in the form of pulse to the capstan motor till it travels exactly for one frame. Thus, the magnetic tape is made to travel exactly for one frame.

Therefore, a primary object of the present invention is to provide a magnetic video recording apparatus for intermitteht recording which enables a magnetic tape to intermittently travel exactly by one frame.

A principal advantage of the present invention is that a magnetic tape can be made to travel exactly for one frame even if the driving voltage, the load of a capstan motor, the load of a tape travelling system and the like are changed.

Another advantage of the present invention is that the time of recording that can be made by one magnetic tape does not change since the travelling distance of a magnetic tape for one frame is precisely constant.

Still a further advantage of the present invention is that since the travelling distance of a magnetic tape for one frame is precisely constant, the frequency of control pulses is also precisely constant and therefore, any disturbance does not appear in the picture if reproducing is made continuously in the magnetic tape intermittently recorded.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flow chart showing an operation of the control circuit in FIG. 3.

DESCRIPTION OF THE PREFERRED EMBODIMENT

Figure 1:
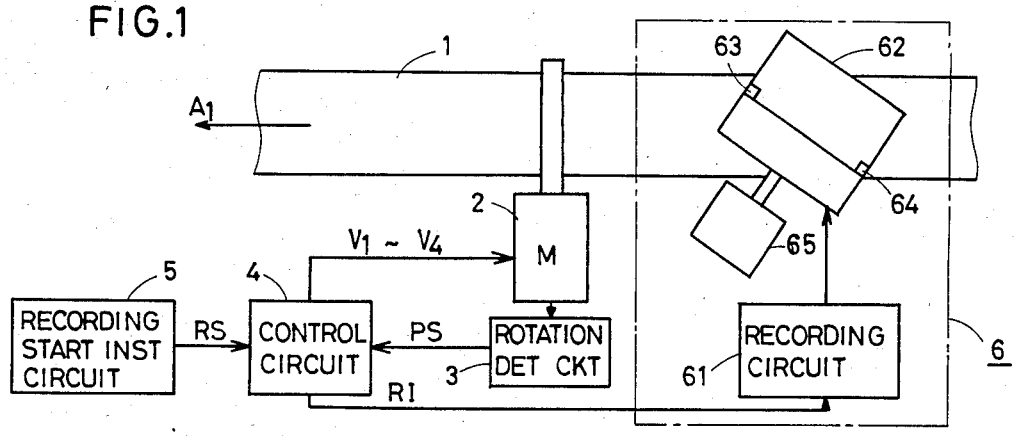
FIG. 1 is a block diagram showing an embodiment of the present invention.

FIG. 1 is a block diagram showing an embodiment of the present invention. A magnetic tape 1 is brought into contact with a capstan motor 2. The capstan motor 2 is connected with a rotation detecting circuit 3 and a control circuit 4. The control circuit 4 is connected with a recording start instructing circuit 5 and a video recording circuit 6. The capstan motor 2 enables the magnetic tape 1 to travel in the direction of the arrow $A_1$ in response to the driving voltage $V_1$ to $V_4$ applied thereto. The rotation detecting means 3 is coupled mechanically to the capstan motor 2 and provides pulse signals PS according to the rotation of the capstan motor 2. The control circuit 4 will be described afterwards in detail with reference to FIG. 3. The recording start instructing circuit 5 comprises for example a manual switch or a timer and in response thereto, provides intermittently recording start signals RS for instructing the start of recording. The video recording circuit 6 comprises a rotating drum 62, two rotating heads 63 and 64 provided thereon, a drum motor 65 for rotating the rotating drum 62 and a recording circuit 61 for applying video signals to the rotating heads 63 and 64. The video recording circuit 6 records video signals in the magnetic tape 1 in response to the recording instruction RI from the control circuit 4. The rotation detecting circuit 3 and the control circuit 4 will be described in detail in the following.

Figure 2A:
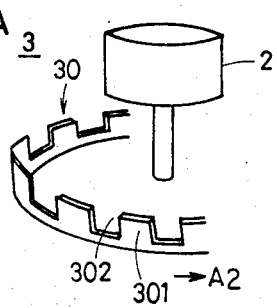
FIG. 2A is a perspective view showing the outline of a rotation detecting circuit in FIG. 1.
Figure 2B:
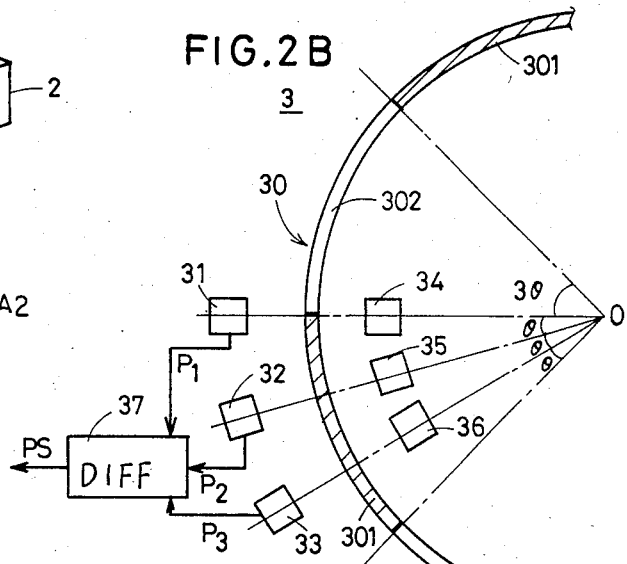
FIG. 2B is a plane view showing in detail the rotation detecting circuit in FIG. 1.
Figure 2C:
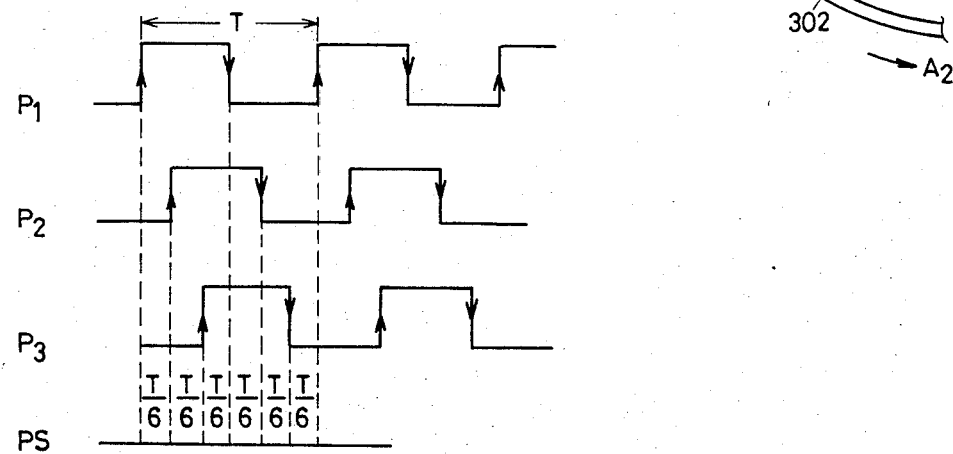
FIG. 2C is a timing chart of the signals in FIG. 2B.

First, the rotation detecting circuit 3 will be described. FIG. 2A is a perspective view showing the outline of the rotation detecting circuit 3; FIG. 2B is a plane view showing in detail the rotation detecting circuit 3; and FIG. 2C is a timing chart of the signals in FIG. 2B. Referring to FIG. 2A, a disk 30 of a gear type is coupled mechanically to the capstan motor 2 so that the disk 30 rotates in the direction of the arrow $A_2$ according to the rotation of the capstan motor 2. The disk 30 comprises teeth 301 and gaps 302 respectively provided at equal intervals. Referring to FIG. 2B, three light receiving elements 31 to 33 are provided outside the disk 30. Inside the disk 30, light emitting elements 34 to 36 are provided so as to be opposed respectively to the light receiving elements 31 to 33. A light emitting element 34 and a light receiving element 31, a light emitting element 35 and a light receiving element 32, and a light emitting element 36 and a light receiving element 33 constitute respectively pairs of sensors. The above described teeth 301 and gaps 302 each have a length of $3\theta$ as an angle of circumference. Three pairs of sensors are disposed to be separated from each other by an angle $\theta$ of circumference. The light receiving elements 31 to 33 receive light from the light emitting elements 34 to 36 and provide respectively rectangular wave signals $P_1$ to $P_3$. A differentiating circuit 37 connected to the light receiving elements 31 to 33 detects the leading and trailing edges of the rectangular wave signals $P_1$ to $P_3$ so as to generate pulse signals PS. Referring to FIG. 2C, rotation of the disk 30 causes the light emitting elements 31 to 33 to provide respectively rectangular wave signals $P_1$ to $P_3$ having a frequency T. In this case, because of the disposition of the pairs of sensors shown in FIG. 2B, the leading edges and trailing edges of the respective rectangular wave signals deviate from each other by T/6. Accordingly, the differentiating circuit 37 provides pulses signals PS of the frequency T/6. By thus disposing the pairs of sensors to separate them from each other, the rotating distance of the capstan motor 2 can be detected with a high precision. More specifically, assuming that the number of the teeth 301 and that of the gaps 302 of the disk 30 are respectively 30 for example, a pulse signal PS corresponds to an amount obtained by dividing the frequency T of each rectangular wave signal by six and accordingly, one rotation of the capstan motor is divided into $30 \times 6 = 180$ portions so that the rotating phase can be detected. Thus, the rotating distance of the capstan motor 2 can be detected precisely.

Figure 3:
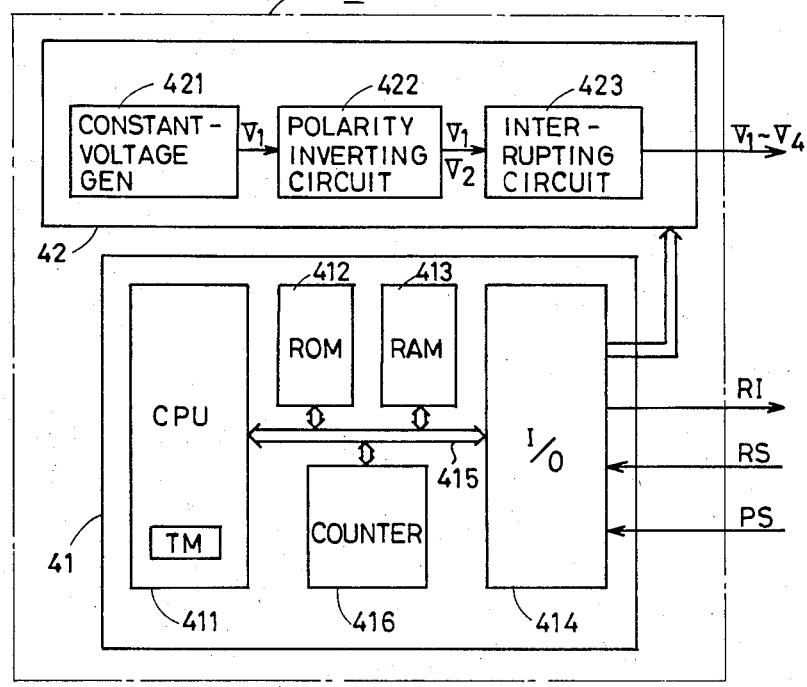
FIG. 3 is a block diagram showing in detail a control circuit in FIG. 1.

FIG. 3 is a block diagram showing in detail the control circuit 4 in FIG. 1. The control circuit 4 comprises roughly a microcomputer 41 and a power supply circuit 42. The microcomputer 41 comprises a central processing unit (CPU) 411, a read-only memory (ROM) 412, a random-access memory (RAM) 413, an input-output (I/O) interface 414, a counter 416 and a bus 415 connecting them. The microcomputer 41 further comprises a timer TM formed of software, for example. The I/O interface 414 inputs therein the above described recording start signals RS and pulse signal PS and outputs therefrom the above described recording instruction RI and the control signal to the power supply circuit 42. The counter 416 counts the number of pulse signals PS. The power supply circuit 42 comprises a constant-voltage generating circuit 421, a polarity inverting circuit 422 connected thereto and an interrupting circuit 423 connected thereto. The constant-voltage generating circuit 421 operates responsive to the control of the microcomputer 41 so as to generate driving voltage $V_1$ which is constant voltage of the positive polarity. The polarity inverting circuit 422 operates responsive to the control of the microcomputer 41 so as to provide the driving voltage $V_1$ without inversion or to provide driving voltage $V_2$ which is constant voltage of the negative polarity obtained by inversion of the polarity of the driving voltage $V_1$. The interrupting circuit 423 operates responsive to the control of the microcomputer 41 so as to provide the above described driving voltages $V_1$ and $V_2$ without interruption or to interrupt them to provide driving voltage $V_3$ which is pulse voltage of the positive polarity or driving voltage $V_4$ which is pulse voltage of the negative polarity.

Figure 5A:
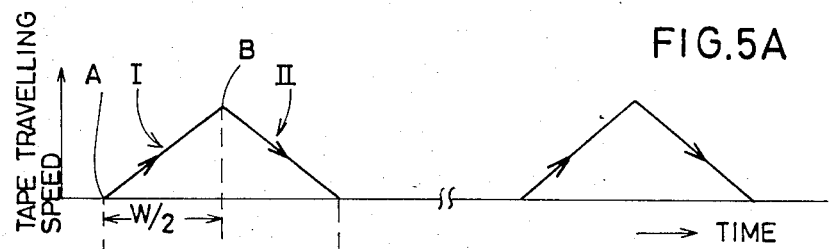
FIG. 5A shows change in time with respect to the travelling speed of a magnetic tape.
Figure 5B:
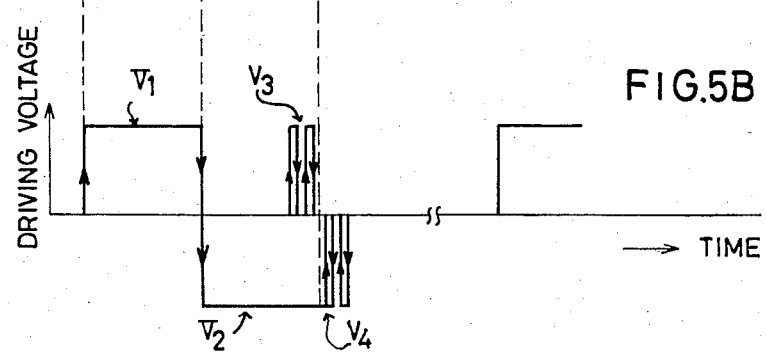
FIG. 5B shows change in time with respect to the driving voltage.

Now, a total operation in the embodiment in FIG. 1 will be described in the following with reference to FIGS. 4, 5A and 5B. FIG. 4 is a flow chart showing an operation of the control circuit 4 shown in FIG. 3; FIG. 5A shows change in time concerning the rotational speed of the capstan motor 2, that is, change in time concerning the travelling speed of the magnetic tape 1; and FIG. 5B shows change in time concerning the driving voltage. Referring mainly to FIG. 4, in the step Sl, the control circuit 4 provides driving voltage $V_1$ of the positive polarity in response to the recording start signal RS from the recording start instructing circuit 5 so that the voltage $V_1$ is applied to the capstan motor 2. As a result, the capstan motor 2 is made to rotate, whereby the magnetic tape 1 starts to travel. At the same time, the rotation detecting circuit 3 starts to provide pulse signals PS. On the other hand, by means of a control head not shown, control pulses for controlling the travelling of the magnetic tape 1 at the time of reproduction are written in the magnetic tape 1. In the step S2, measurement of the travelling time of the tape is started by the timer TM. Subsequently in the step S3, the counter 416 starts to count the number of pulses signals PS. Furthermore, a recording instruction RI is provided from the control circuit 4 to the video recording circuit 6, whereby the video recording circuit 6 starts to record video signals in the magnetic tape 1. Referring to FIGS. 5A and 5B, the section I represents the state during these steps. More specifically stated, the rotational speed of the capstan motor 2, namely the travelling speed of the magnetic tape 1 increases gradually from the point A according to the application of the driving voltage $V_1$. Returning to FIG. 4, in the step S4, it is determined by the timer TM whether a time interval W/2 equivalent to a half of the unit time interval W required for recording of one frame has passed or not. If the time interval W/2 has passed, the program proceeds to the step S5, where the driving voltage $V_2$ of the negative polarity is provided from the control circuit 4 instead of the driving voltage $V_1$ so that reverse voltage is applied to the capstan motor 2. As a result, the rotational speed of the capstan motor 2 decreases. Referring to FIGS. 5A and 5B, the section II represents the state at this time. More specifically stated, at the time B when W/2 has passed, the driving voltage $V_2$ of the negative polarity is applied to the capstan motor 2, so that the rotational speed of the capstan motor 2 decreases as shown in the drawings. Returning to FIG. 4, in the step S6, it is determined by the timer TM whether the unit time interval W required for recording of one frame has passed or not. If the unit time interval W has passed, the program proceeds to the step S7. Then, application of the recording instruction RI from the control circuit 4 to the video recording circuit 6 is stopped, whereby the video recording circuit 6 stops the recording of video signals in the magnetic tape 1. In the step S7, the counter 416 determines the count number K at the time. Assuming that the number of pulse signals corresponding to the travelling distance of the magnetic tape 1 for one frame is a predetermined value PV, the program proceeds to the step S8 in case of K=PV, to the step S9 in case of K<PV and to the step S11 in case of K>PV. For example, if the magnetic tape 1 is made to travel for one frame by one rotation of the capstan motor, this predetermined value PV becomes 180 since 180 pulse signals are provided from the rotation detecting circuit 3 by one rotation of the capstan motor 2 as described above. In the step S8, application of the voltage to the capstan motor 2 is stopped, whereby the magnetic tape 1 stops travelling. Accordingly, the magnetic tape 1 is made to travel exactly for one frame. In the step S9, the pulse voltage $V_3$ of the positive polarity is provided from the control circuit 4, so that positive pulse voltage is applied to the capstan motor 2. As a result, the magnetic tape 1 is made to further travel slowly. The driving voltage $V_3$ in FIG. 5B shows this state. In the step S10, it is determined whether the count number K amounts to the predetermined value PV or not. If the number K amounts to the value PV, the program proceeds to the step S8. In the step S11, the pulse voltage $V_4$ of the negative polarity is provided from the control circuit 4, so that negative pulse voltage is applied to the capstan motor 2, which causes the magnetic tape 1 to travel slowly in the opposite direction. At the same time, in the step S12, the counter 416 counts down. The driving voltage $V_4$ in FIG. 5B shows this state. In the step S13, it is determined whether the count number K attains the predetermined value PV or not. If the number K attains the predetermined value PV, the program proceeds to the step S8.

As described above, the magnetic tape 1 is made to travel exactly for one frame even if there are changes in the driving voltage, the load of the capstan motor, the load of the tape travelling system and the like. Accordingly, the time of recording that can be made by one magnetic tape does not change. In addition, the frequency of control pulses recorded in the magnetic tape in a manner related to the start of travelling of the magnetic tape is precisely constant and accordingly, in case where a magnetic tape intermittently recorded is continuously reproduced, control of a capstan servo system can be made smoothly and no disturbance appears in the picture.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic video recording apparatus for making a magnetic tape intermittently travel by one frame so as to record video signals therein, comprising:
   a voltage driven capstan motor for enabling said magnetic tape to travel,
   rotation detecting means mechanically coupled to said capstan motor for providing pulse signals according to the rotation of said capstan motor,
   recording start instructing means for providing intermittently a recording start signal for instructing the start of recording, and
   control means comprising:
      power supply means for providing a driving voltage ($V_1$) of a first polarity in response to said recording start signal, a driving voltage ($V_2$) of a second polarity in response to a first control signal applied thereto, a driving voltage in the form of pulses ($V_3$) of said first polarity in response to a second control signal applied thereto and a driving voltage in the form of pulses ($V_4$) of said second polarity in response to a third control signal applied thereto,
      timer means for starting measurement of a unit time interval required for recording of said one frame in response to said recording start signal, providing said first control signal when a time interval half as long as said unit time interval has passed,
      counter means for starting count-up in response to said recording start signal or said second control signal and starting count-down in response to said third control signal, and
      comparing means for comparing a count number K in said counter means with a predetermined value PV at a lapse of said unit time interval so as to stop application of said first control signal if K=PV, to provide said second control signal if K<PV until the condition K=PV is satisfied and to provide said third control signal if K<PV until the condition K=PV is satisfied, said predetermined value PV being a value corresponding to a travelling distance of said magnetic tape for said one frame.

2. A magnetic video recording apparatus in accordance with claim 1, wherein said power supply means comprises:
   a constant voltage generating circuit responsive to said recording start signal for generating said driving voltage ($V_1$) of the first polarity of constant voltage, a polarity inverting circuit connected to said constant voltage generating circuit for inverting the polarity of said driving voltage ($V_1$) of the first polarity when said first or third control signal is applied, and providing the voltage ($V_1$) without inversion when said first or third control signal is not applied, so that said driving voltage ($V_1$) of the first polarity and said driving voltage ($V_2$) of the second polarity are provided, and an interrupting circuit connected to said polarity inverting circuit for providing an interruption of said driving voltage ($V_1$ and $V_2$) from said polarity inverting circuit when said second or third control signal is applied and providing said voltage ($V_1$ and $V_2$) without interruption when said second or third control signal is not applied, so that said driving voltage ($V_1$) of the first polarity, said driving voltage ($V_2$) of the second polarity, said driving voltage pulses ($V_3$) of the first polarity and said driving voltage pulses ($V_4$) of the second polarity are provided.

3. A magnetic video recording apparatus in accordance with claim 1, wherein said rotation detecting means comprises:

a disk mechanically coupled to said capstan motor and having teeth and gaps provided with a predetermined angle of circumference, a plurality of light emitting elements and light receiving elements respectively opposed to each other with respect to the teeth and the gaps of said disk to form a plurality of pairs of sensors, said plurality of pairs of sensors being disposed to be separated from each other by an angle of circumference equivalent to a third of said predetermined angle of circumference, and said light receiving elements respectively receiving light from said light emitting elements so as to provide rectangular wave signals respectively, and a differentiating circuit connected to said light receiving elements for detecting the leading edges and trailing edges of said rectangular wave signals so as to provide said pulse signals.

* * * * *